Patented Dec. 11, 1951

2,578,053

UNITED STATES PATENT OFFICE 2,578,053

PIPERAZINE OXIDES AND METHOD OF PREPARING THE SAME

John J. Denton, Bound Brook, and Hugh W. Stewart, Plainfield, N. J., assignors to American Cyanamid Company, New York, N. Y., a corporation of Maine No Drawing. Application October 5, 1950, Serial No. 188,642

8 Claims. (Cl. 260—268)

This invention relates to substituted piperazine oxides. More particularly, it relates to 1-di-lower-alkylcarbamyl-4-methyl piperazine monooxides and to a method of preparing the same.

In United States Patent 2,467,895 there is described a group of compounds known as 1-dialkylcarbamyl-4-alkyl piperazine. These compounds, particularly 1-diethylcarbamyl-4-methyl piperazine, have proven effective as filaricides and in the treatment of ascarides in humans. While effective therapeutic agents, the compounds in some instances produce undesirable side effects.

We have now found that the mono-oxide derivative of the lower members of the series of the compounds described hereinbefore are active filaricidal compounds, and in addition have a considerably lower toxicity when used in equivalent amounts. They offer the advantage, therefore, in therapy of being better tolerated by the patients at therapeutic dose levels. They offer the further advantage of administration at higher dosage without increased undesirable side effects. Finally, they offer the advantage that with higher doses being tolerated they may produce therapeutic action in other parasitic diseases not now affected by the therapeutic doses of the known compounds.

These new compounds may be described as 1-di-lower-alkylcarbamyl-4-methyl piperazine oxides. The exact structure of the 1-di-lower-alkylcarbamyl-4-methyl piperazine oxides has not been fully determined as yet. It is believed, however, that they may be represented by the following structural formula:

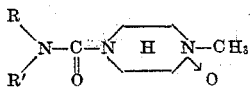

in which R and R' are lower alkyl radicals. In the formula above R and R' may be like or unlike lower alkyl radicals such as methyl, ethyl, propyl or butyl.

The compounds of the present invention are, in general, very hygroscopic and have relatively low melting points. They are soluble in most organic solvents.

The 1-di-lower-alkylcarbamyl-4-methyl piperazine oxides of the present invention can be prepared by reacting a 1-di-lower-alkylcarbamyl-4-methyl piperazine with a peroxide or per acid in the presence of a solvent. The reaction is preferably carried out at room temperature or slightly above, however, it may, in general, be carried out within the temperature range of 0° C. to about 75° C.

The preferred solvents in carrying out the present reaction are the lower aliphatic alcohols, however, other solvents may be used such as water, lower aliphatic ketones, and the like.

In carrying out the reaction we prefer to use hydrogen peroxide, although other peroxides or per acids may be used. The strength of the peroxide is not critical, however, in the case of hydrogen peroxide it was found that better results were obtained when the hydrogen peroxide was at least 3%.

The invention will now be illustrated in greater particularity by means of the following example in which a representative 1-di-lower-alkylcarbamyl-4-methyl piperazine oxide is prepared.

To a solution of 99.7 parts of 1-diethylcarbamyl-4-methyl piperazine in 67 parts of ethyl alcohol is slowly added 56.7 parts of 30% aqueous hydrogen peroxide. The temperature is maintained 30–40° C. by cooling. After standing at room temperature for four days, the solvent is removed on a steam bath under reduced pressure. The viscous oil residue solidifies on cooling. The very hygroscopic 1-diethylcarbamyl-4-methyl piperazine oxide monohydrate is purified by crystallization from acetone-ether mixture. It melts at 60.5°–62° C.

In the above example 1-diethylcarbamyl-4-methyl piperazine is used as starting material, other 1-di-lower-alkylcarbamyl-4-methyl piperazines can be used such as 1-dimethylcarbamyl-4-methyl piperazine; 1-methylethylcarbamyl-4-methyl piperazine; etc. to prepare the corresponding piperazine oxides.

We claim:

1. 1-di-lower-alkylcarbamyl-4-methyl - piperazine mono-oxides.

2. 1-diethylcarbamyl-4-methyl piperazine oxide.

3. 1-dimethylcarbamyl - 4 - methyl piperazine oxide.

4. 1-methylethylcarbamyl-4-methyl piperazine oxide.

5. A method which comprises reacting a 1-dilower-alkylcarbamyl-4-methyl piperazine with peroxides in the presence of a non-acidic polar solvent and recovering a 1-di-lower-alkylcarbamyl-4-methyl piperazine oxide therefrom.

6. A method which comprises reacting 1-diethylcarbamyl-4-methyl piperazine with peroxides in the presence of a lower aliphatic alcohol and recovering 1-diethylcarbamyl-4-methyl piperazine oxide therefrom.

7. A method which comprises reacting 1-dimethylcarbamyl-4-methyl piperazine with peroxides in the presence of a lower aliphatic alcohol and recovering 1-dimethylcarbamyl-4-methyl piperazine oxide therefrom.

8. A method which comprises reacting 1-methylethylcarbamyl-4-methyl piperazine with peroxides in the presence of a lower aliphatic alcohol and recovering 1-methylethylcarbamyl-4-methyl piperazine oxide therefrom.

JOHN J. DENTON.
HUGH W. STEWART.

REFERENCES CITED

The following references are of record in the file of this patent:

UNITED STATES PATENTS

| Number | Name | Date |
|---|---|---|
| 2,518,130 | Evans et al. | Aug. 8, 1950 |